(12) United States Patent
Mitelman

(10) Patent No.: US 11,941,020 B2
(45) Date of Patent: Mar. 26, 2024

(54) DISPLAYING QUERY RESULTS USING MACHINE LEARNING MODEL-DETERMINED QUERY RESULTS VISUALIZATIONS

(71) Applicant: MICRO FOCUS LLC, Santa Clara, CA (US)

(72) Inventor: Tamir Mitelman, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 178 days.

(21) Appl. No.: 17/186,769

(22) Filed: Feb. 26, 2021

(65) Prior Publication Data

US 2022/0277019 A1 Sep. 1, 2022

(51) Int. Cl.
| | | |
|---|---|---|
| *G06F 17/00* | (2019.01) | |
| *G06F 7/00* | (2006.01) | |
| *G06F 16/2453* | (2019.01) | |
| *G06F 16/2457* | (2019.01) | |
| *G06F 16/26* | (2019.01) | |
| *G06F 18/214* | (2023.01) | |
| *G06N 20/00* | (2019.01) | |

(52) U.S. Cl.
CPC ........ *G06F 16/26* (2019.01); *G06F 16/24535* (2019.01); *G06F 16/24578* (2019.01); *G06F 18/2148* (2023.01); *G06N 20/00* (2019.01)

(58) Field of Classification Search
CPC .............. G06F 16/26; G06F 16/24578; G06F 16/24535; G06N 20/00; G06K 9/6257
USPC ........................................................ 707/722
See application file for complete search history.

(56) References Cited

U.S. PATENT DOCUMENTS

| | | | |
|---|---|---|---|
| 10,447,738 B2 | 10/2019 | Joseph et al. | |
| 10,523,695 B2 | 12/2019 | Fach et al. | |
| 10,798,113 B2 | 10/2020 | Muddu et al. | |
| 2004/0220905 A1* | 11/2004 | Chen .................... | G06F 16/951 707/999.003 |
| 2008/0065603 A1* | 3/2008 | Carlson ................ | G06F 16/951 707/999.003 |
| 2008/0222132 A1* | 9/2008 | Pan ..................... | G06F 16/9535 707/999.005 |
| 2008/0282187 A1* | 11/2008 | Buschman ........... | G06F 3/0482 707/E17.119 |
| 2010/0042623 A1* | 2/2010 | Feng ..................... | G06F 16/35 707/E17.127 |

(Continued)

FOREIGN PATENT DOCUMENTS

WO    WO-2020201247 A1    10/2020

OTHER PUBLICATIONS

Srinivasan et al. "NL4DV: Toolkit for Natural Language Driven Data Visulaization", IEEE VIS 2016 POSTERSOct. 23-28, Baltimore, Maryland, USA.

(Continued)

*Primary Examiner* — Pavan Mamillapalli
(74) *Attorney, Agent, or Firm* — Sheridan Ross P.C.

(57) ABSTRACT

A query is converted into a structured query tokenization. One or more query results visualizations for the query are determined by applying a supervised machine learning model to the structured query tokenization into which the query has been converted. Query results of the query are displayed using the determined query results visualizations.

20 Claims, 6 Drawing Sheets

(56) References Cited

U.S. PATENT DOCUMENTS

| | | | |
|---|---|---|---|
| 2012/0215727 A1* | 8/2012 | Malik | G06F 18/2155 |
| | | | 706/12 |
| 2013/0031113 A1* | 1/2013 | Feng | G06F 16/243 |
| | | | 707/E17.014 |
| 2015/0161202 A1* | 6/2015 | Shapira | G06F 16/235 |
| | | | 707/723 |
| 2015/0324527 A1* | 11/2015 | Siegel | G16B 50/30 |
| | | | 705/3 |
| 2018/0165604 A1* | 6/2018 | Minkin | G06Q 10/06 |
| 2019/0102390 A1 | 4/2019 | Antunes et al. | |
| 2020/0082224 A1* | 3/2020 | Sikka | G06F 18/2413 |
| 2022/0197900 A1* | 6/2022 | Maheshwari | G06F 16/90324 |

OTHER PUBLICATIONS

Vartak et al. "SEEDB: Automatically Generating Query Visualizations", Proceedings of the VLDB Endowment, vol. 7, No. 13, Sep. 1-5, 2014, Hangzhou, China.

* cited by examiner

DISPLAYING QUERY RESULTS USING MACHINE LEARNING MODEL-DETERMINED QUERY RESULTS VISUALIZATIONS

BACKGROUND

Data is the lifeblood of many entities like business and governmental organizations, as well as individual users. Large amounts of data are often generated or collected by computing devices and their users. The data can be subjected to various analytics in order to glean insights into the information they contain.

DETAILED DESCRIPTION

Figure 1:
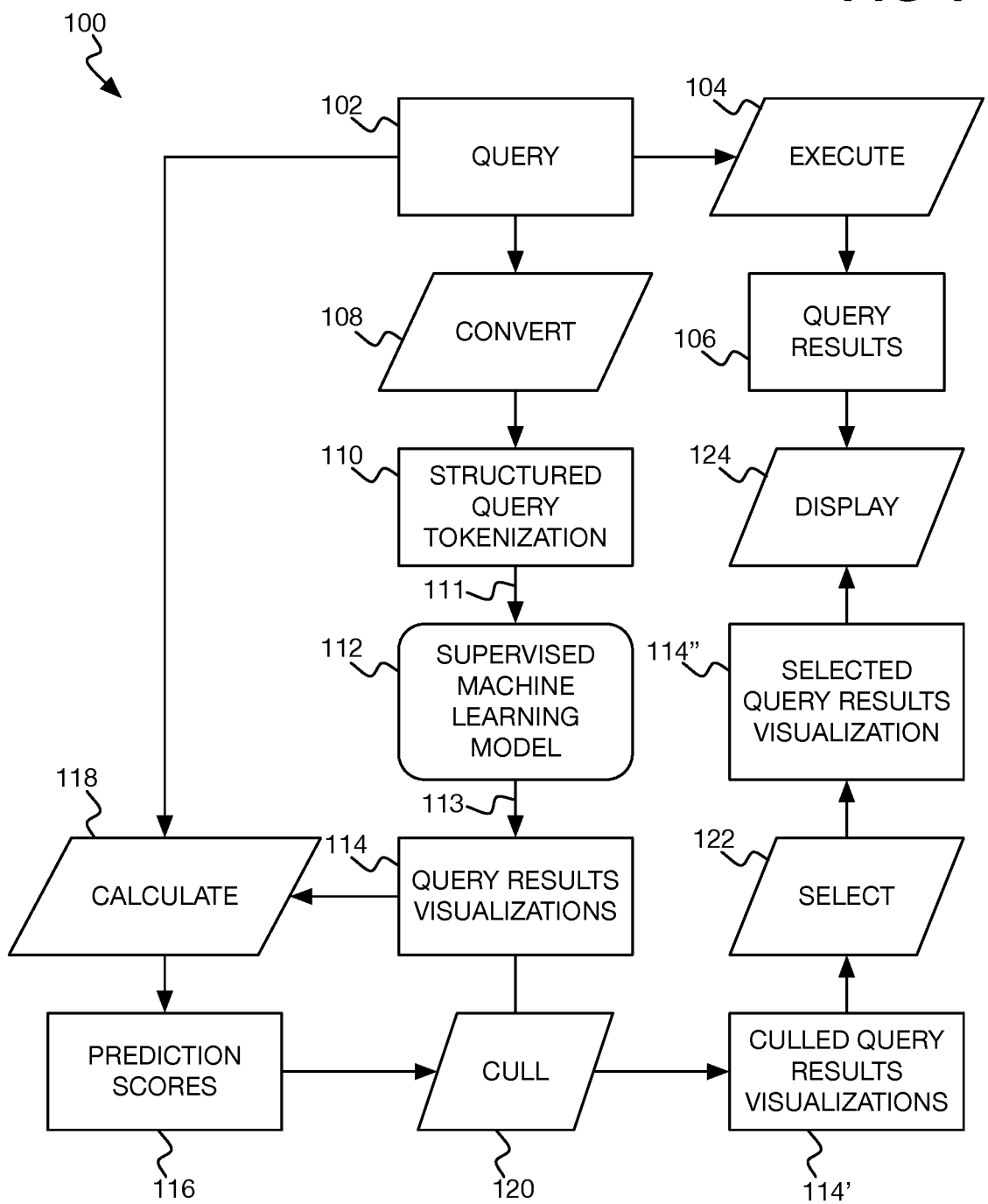
FIG. 1 is a diagram of an example process for displaying query results of a query using a supervised machine learning model-determined query results visualization.

As noted in the background, entities as well as individual users can have large amounts of data that are subjected to analytics to glean insights into the information that they contain. For example, queries may be run or executed against the data to identify the data of interest. However, even once the data of interest has been identified, obtaining insights and drawing conclusions regarding the data may still be difficult. For instance, the identified data of interest may be quite large in volume, making it difficult for a user to analyze the data.

Therefore, users may display the query results (i.e., the data identified by running or executing a query) using a visualization to graphically depict the same. A query results visualization is the graphical representation of the data returned by a query using graphical elements. Example query results visualizations include bar charts, line graphs, and histograms of various types, among other types of such visualizations. By displaying the query results using an appropriate visualization, a user may therefore be able to more readily discern trends and draw other conclusions regarding the data.

However, selecting an appropriate query results visualization for the query results returned by executing a query may itself be difficult. Although an expert or experienced user may be able to select a query results visualization for displaying query results that most readily permits insights into the data to be gleaned, more novice users may be unsuccessful in this endeavor. As a result, many users will be unable to draw conclusions from and perform other analytics on data, obviating the point of collecting the data in the first place. Indeed, even expert and experienced users may expend significant time and effort to create an appropriate query results visualization. Users at all skill levels may also create visualizations that do not actually assist in analyzing the underlying data as well.

Techniques described herein ameliorate these and other issues by using a supervised machine learning model to determine a query results visualization for displaying query results of a query. The query is converted into a structured query tokenization, and the machine learning model is applied to the structured query tokenization to generate one or more query results visualizations. The supervised machine learning model is applied to a structured query tokenization into which the query has been converted, rather than the query itself, which has been found to yield a better trained machine learning model. The query results returned by executing the query are displayed using these query results visualizations.

As a result, an appropriate query results visualization can be identified for a query even if the user who created the query is unskilled at visualization selection, and without requiring even an expert user from having to expend significant time and effort to create the visualization. The techniques can thus ensure that the most relevant query results visualization is presented for a query. The user is therefore able to glean insights into the query results that he or she may not otherwise have been able to.

The techniques described herein employ a novel structured query tokenization on which basis the supervised machine learning model that predicts query results visualizations is trained and used. The structured query tokenization into which a query is converted is specifically adapted for and particular to usage and training of such a supervised machine learning model. As is described in detail below, such a structured query tokenization differs from a structured query tokenization into which a query may be converted during query evaluation in actually executing the query. Indeed, the structured query tokenization used herein cannot be used for executing a query.

The novel structured query tokenization, in other words, permits a supervised machine learning model to be trained and used to predict query results visualizations for queries. Training such a machine learning model from queries themselves has proven to not provide accurate visualization prediction, even for queries that are themselves in structured form, such as in the case of queries that conform to the structured query language (SQL) format. Training a machine learning model from structured query tokenizations used during query optimization has likewise proven not to provide accurate visualization prediction.

In this respect, it is noted that the novel structured query tokenization is used herein for a different purpose than existing structured query tokenizations. The latter can be employed during query optimization to improve query execution performance. By comparison, the former is employed for the specific goal of identifying relevant query results visualizations for queries.

FIG. 1 shows an example process 100 for displaying query results of a query using a supervised machine learning model-determined query results visualization. A query 102 is executed (104) to yield query results 106 of the query 102. The query 102 may be a structured query, such as formatted in accordance with the structured query language (SQL), or may be an unstructured query, such as a natural language query. The query 102 may be executed by a query execution engine, and may be optimized by a query optimizer as part of query execution.

The query 102 is converted (108) into a structured query tokenization 110. The structured query tokenization 110 tokenizes the query 102, and adds structure to the query 102 if unstructured or restructures the query 102 if structured. A specific example of a structured query tokenization 110 is described later in the detailed description, as is an example process for converting the query 102 into the structured query tokenization 110.

In general, however, the structured query tokenization 110 is as noted above different than the type of tokenization to which the query 102 may be converted by a query optimizer or tokenizer as part of query execution. For instance, the structured query tokenization 110 may abstract or generalize the query 102, which would not be useful during query execution since such introduced imprecision would yield less accurate query results 106. The structured query tokenization 110 is therefore not used for executing the query 102 in the process 100, and indeed could not be used for executing the query 102.

The structured query tokenization 110 is input (111) to a supervised machine learning model 112, which outputs (113) one or more query results visualizations 114 by which the query results 106 can be displayed. Examples of such a supervised machine learning model 112 include neural networks, multi-valued k-nearest neighbor models, and multi-valued decision trees. How the supervised machine learning model 112 can be trained to provide query results visualizations 114 suitable for different queries 102 is described later in the detailed description.

Prediction scores 116 may in one implementation be calculated (118) for the query 102. The query 102 has a prediction score 116 for each query results visualization 114. Each prediction score 116 predicts how well a corresponding query results visualization is likely to fit the query 102. A prediction score is thus based on the query results visualization 114 and the query 102 itself.

Calculation of the prediction scores 116 can be separate from determination of the query results visualizations 114. For instance, the supervised machine learning model 112 may not itself output the prediction scores 116. Examples of prediction score calculation techniques that can be used include similarity measures and correlation measures.

For example, as to similarity measures, given the query 102, the similarity to the queries on which basis the supervised machine learning model 112 has been trained can be calculated. For example, the similarity may reflect identical components of the structured query tokenization 110 of the query 102 and the structured query tokenization of each of the training queries. An edit or Levenshtein distance may be used to measure the difference between the structured query tokenization 110 and the structured query tokenization of each training query, by counting the minimum number of operations needed to transform the former into the latter.

For instance, if the structured query tokenization 110 of the query 102 is [source address::ipaddress, OR, destination address::ipaddress, OR, source username::string, AND, category::string], and the structured query tokenization of a training query is [source address::ipaddress, OR, source username::string, AND, category::string], the similarity would be the percentage of identical components. In this case, there are eight identical components in the tokenization of the training query out of a total of eleven components in the tokenization 110 of the query 102. As such, the result is 8/11=72.7% similarity between the structured query tokenization 110 of the query 102 and the structured query tokenization of the training query. Therefore, a prediction score 116 of 72.7% is assigned to the query 102 and the query results visualization(s) 114 of the training query in question, representing a 72.7% fit between the query 102 and these visualization(s) 114.

As another example, as to correlation measures, each query results visualization 114 can be analyzed per its input training queries to yield a statistical correlation measurement between the visualization 114 and certain components of the structured query tokenization 110 of the query 102. For example, the same query results visualization 114 may have been generated during training of the supervised machine learning model 112 for ten different training queries. Identical components of the structured query tokenizations of these ten training queries are identified; for instance, nine of the ten tokenizations may include "source address::ipaddress, OR, destination address::ipaddress." This means that in 90% of the cases (i.e., the correlation percentage), the visualization 114 in question was generated when a training query included both source address and destination address. Therefore, if the structured query tokenization 110 of the query 102 itself includes these components, a prediction score 116 of 90% is assigned to the query 102 and the query results visualization(s) 114 of the training query or queries in question, representing a 90% fit between the query 102 and these visualization(s) 114.

The query results visualizations 114 output by the supervised machine learning model 112 can be culled (120) based on the prediction scores 116, resulting in culled query results visualizations 114'. For example, query results visualizations 114 that have prediction scores 116 less than a threshold may be discarded. As another example, query results visualizations 114 other than a threshold number of query results visualizations 114 having the highest prediction scores 116 may be discarded (that is, just the threshold number of visualizations 114 having the highest prediction scores 116 are retained). A combination of these two examples may also be used to cull the query results visualizations 114.

A particular query results visualization can be selected (122) from the culled query results visualizations 114', as the selected query results visualization 114". The user can thus accept a visualization 114" by selecting it. For example, the culled query results visualizations 114' may be presented to the user that provided the query 102 for choosing the selected query results visualization 114". The user may also be permitted to reject a visualization 114" either implicitly (i.e., by not selecting it) or explicitly (by explicitly rejecting it). The query results 106 of the query 102 are then displayed (124) using the selected query results visualization 114". That is, the data returned by executing the query is graphically displayed according to the selected query results visualization 114".

Figure 2A:
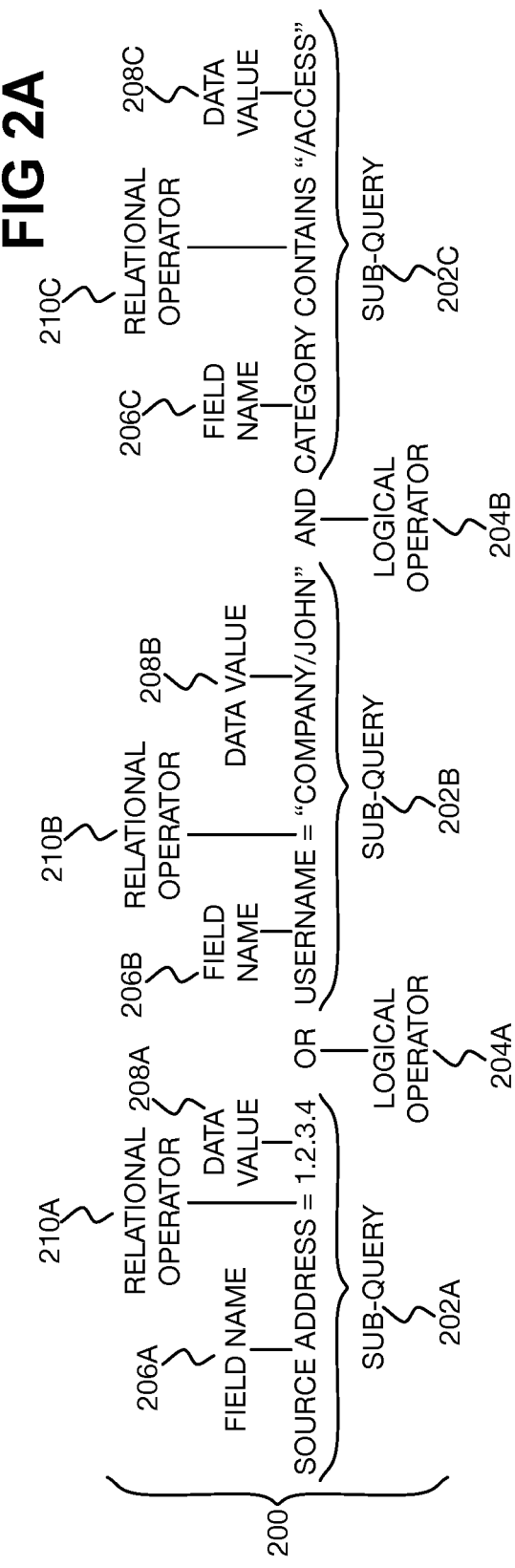
FIG. 2A is a diagram of an example query.

FIG. 2A shows an example query 200. The query 200 is an example of a type of query that can be used as the query 102 within the process 100 of FIG. 1. The query 200 is not a structured query per se, in that the query 200 is not rigidly or strictly formatted according to any defined query language. However, the query 200 is not completely unstructured either, insofar as the query 200 does have a discernible structure.

Specifically, the query 200 includes three sub-queries 202A, 202B, and 202C, which are collectively referred to as the sub-queries 202. More generally there may be more or fewer than three sub-queries 202, however. Adjacent sub-queries 202 are separated by logical operators 204A and 204B, which are collectively referred to as the logical operators 204. The logical operator 204A separates the sub-queries 202A and 202B, and the logical operator 204B separates the sub-queries 202B and 202C.

The overall query 200 is defined by the sub-queries 202 and the logical operators 204. For example, execution of the example query 200 returns data that satisfies the sub-query 202A or that satisfies both the sub-queries 202B and 202C. This is because the logical operator 204B separating the sub-queries 202B and 202C is the logical AND operator, and the logical operator 204A separating the sub-queries 202A and 202B is the logical OR operator.

The sub-queries 202A, 202B, and 202C respectively include field names 206A, 206B, and 206C, collectively referred to as the field names 206; data values 208A, 208B, and 208C, collectively referred to as the data values 208; and relational operators 210A, 210B, and 210C, collectively referred to as the relational operators 210. The field name 206 of a sub-query 202 specifies the name of a data field according to which the data against which the query 200 is to be evaluated is organized. For instance, the data may be organized in records that have values for the data fields having the field names 206.

The data value 208 of a sub-query 202 is thus a particular value that the data against which the query 200 is to be evaluated may have for the field name 206 in question. That is, each data value 208 can be a permissible value for a corresponding field name 206, regardless of whether any data against which the query 200 is to be evaluated has this data value 208 for the field name 206. In the case in which the data is organized in records that have values for data fields having the field names 206, the corresponding data values 208 thus specify such potential values for these data fields.

The relational operator 210 of a sub-query 202 defines the relationship between a corresponding field name 206 and a corresponding data value 208 that is used during evaluation of the sub-query 202. Evaluation of the sub-query 202 therefore returns data records that have data values for the data field having the field name 206 that satisfies the relationship specified by the relational operator 210 vis-à-vis the data value 208. Example relational operators 210 includes identity operators (e.g., equals or not equals), arithmetic operators (e.g., less than or greater than), set operators (e.g., contains or includes, or does not contain or include), and so on.

In the example, data records that satisfy the sub-query 202A are those having a source (network) address equal to 1.2.3.4, because the field name 206A is "source address," the data value 208A is "1.2.3.4," and the relational operator 210A is equals ("="). Data records that satisfy the sub-query 202B are those having a username equal to "company/John," because the field name 206B is "username," the data value 208B is "company/John," and the relational operator 210B is equals ("="). Data records that satisfy the sub-query 202C are those having a category that contains "/access," because the field name 206C is "category," the data value 208C is "/access," and the relational operator 210C is contains or includes.

Figure 2B:
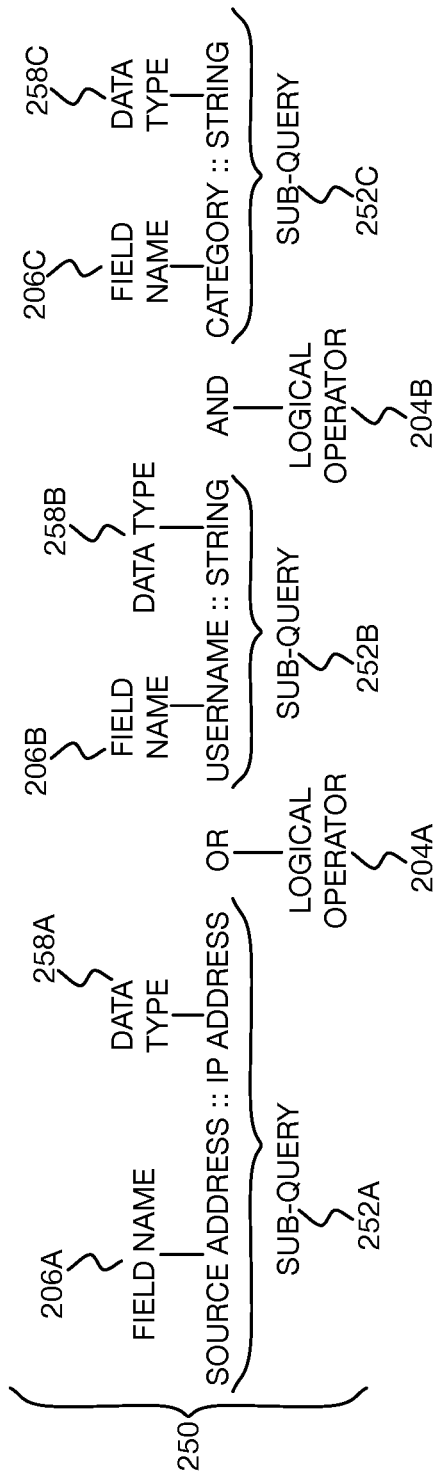
FIG. 2B is a diagram of an example structured query tokenization corresponding to the query of FIG. 2A.

FIG. 2B shows an example structured query tokenization 250 corresponding to the query 200 of FIG. 2A. The structured query tokenization 250 is an example of a type of structured query tokenization 110 to which the query 102 can be converted and used as input to the supervised machine learning model 112 within the process 100 of FIG. 1. The structured query tokenization 250 includes sub-queries 252A, 252B, and 252C, collectively referred to as the sub-queries 252, and which correspond to the sub-queries 202.

The sub-queries 252 of the structured query tokenization 250 of FIG. 2B are separated by the same logical operators 204A and 204B (i.e., the logical operators 204) that the sub-queries 202 are separated by within the query 200 of FIG. 2A. That is, the logical operators 204 of the query 200 are retained within the structured query tokenization 250. Insofar as the logical operators 204 impart or define structure among the sub-queries 252, the query tokenization 250 can be considered a structured query tokenization for at least this reason.

The sub-queries 252A, 252B, and 252C of the structured query tokenization 250 of FIG. 2B also respectively include the field names 206A, 206B, and 206C (i.e., the field names 206) as in the sub-queries 202A, 202B, and 202C of the query 200 of FIG. 2A. That is, the field names 206 of the sub-queries 202 of the query 200 are retained within the sub-queries 252 of the structured query tokenization 250. Insofar as the sub-queries 202 are structurally defined by the field names 206, the query tokenization 250 can be considered a structured query tokenization for at least this reason as well.

The sub-queries 252A, 252B, and 252C of the structured query tokenization 250 of FIG. 2B include data types 258A, 258B, and 258C, which are collectively referred to as the data types 258. The data type 258 of a sub-query 252 of the structured query tokenization 250 is the data type of the data value 208 of the corresponding sub-query 202 of the query 200 of FIG. 2A. That is, the data value 208 of a sub-query 202 is effectively replaced by, or abstracted or tokenized as, its data type 258 within the corresponding sub-query 252. It is noted that while the data type 258 is indeed the type of the data value 208, the data type 258 can be directly inferred from the data field itself, since the database in question can define for the data field the field name 206 and data type 258 thereof.

In the example, the data value 208A of the sub-query 202A of the query 200 of FIG. 2A is a network address, and more specifically is an Internet protocol (IP) address. Therefore, the data type 258A of the corresponding sub-query 252A of the structured query tokenization 250 of FIG. 2B is "IP address." The data values 208B and 208C of the sub-queries 202B and 202C are both strings, and therefore the data types 258B and 258C of the sub-queries 252B and 252C are each "string." Other example data types can include numeric data types, such as integer and/or floating data types, as well as Boolean data types, and so on.

The sub-queries 252 of the structured query tokenization 250 of FIG. 2B do not include the relational operators 210 of the sub-queries 202 of the query 200 of FIG. 2A. That is, the relational operators 210 of the sub-queries 202 are removed in converting the query 200 to the structured query tokenization 250. In the example, the relational operators 210 are replaced by, or tokenized as, the placeholder "::".

The structured query tokenization 250 is not a type of tokenization to which the query 200 would be converted by a query optimizer or tokenizer for query execution purposes. This is because execution of the structured query tokenization 250 would not return the data records that satisfy the query 200. Indeed, to say that the structured query tokenization 250 can be executed is meaningless, because no data values are specified for the field names 206 within the sub-queries 252, nor are relational operators defining the relationship between the field names 206 and such data values. This means that the structured query tokenization 250 is incapable of being executed to return data records that satisfy or match the query 200.

Rather, the structured query tokenization 250 has been determined as being a useful tokenization for the purposes of training and using a supervised machine learning model for providing query results visualizations that are suitable for displaying the query results of the query 200. By comparison, training and using a supervised machine learning model using the query 200 itself as input, or using a less abstract structured query tokenization that can be used for executing the query 200, has been determined to be less able or unable to provide suitable query results visualizations. The structured query tokenization 250 is thus specific for determining query results visualizations via a supervised machine learning model, and therefore different than the type of tokenization used for query execution.

Figure 3:
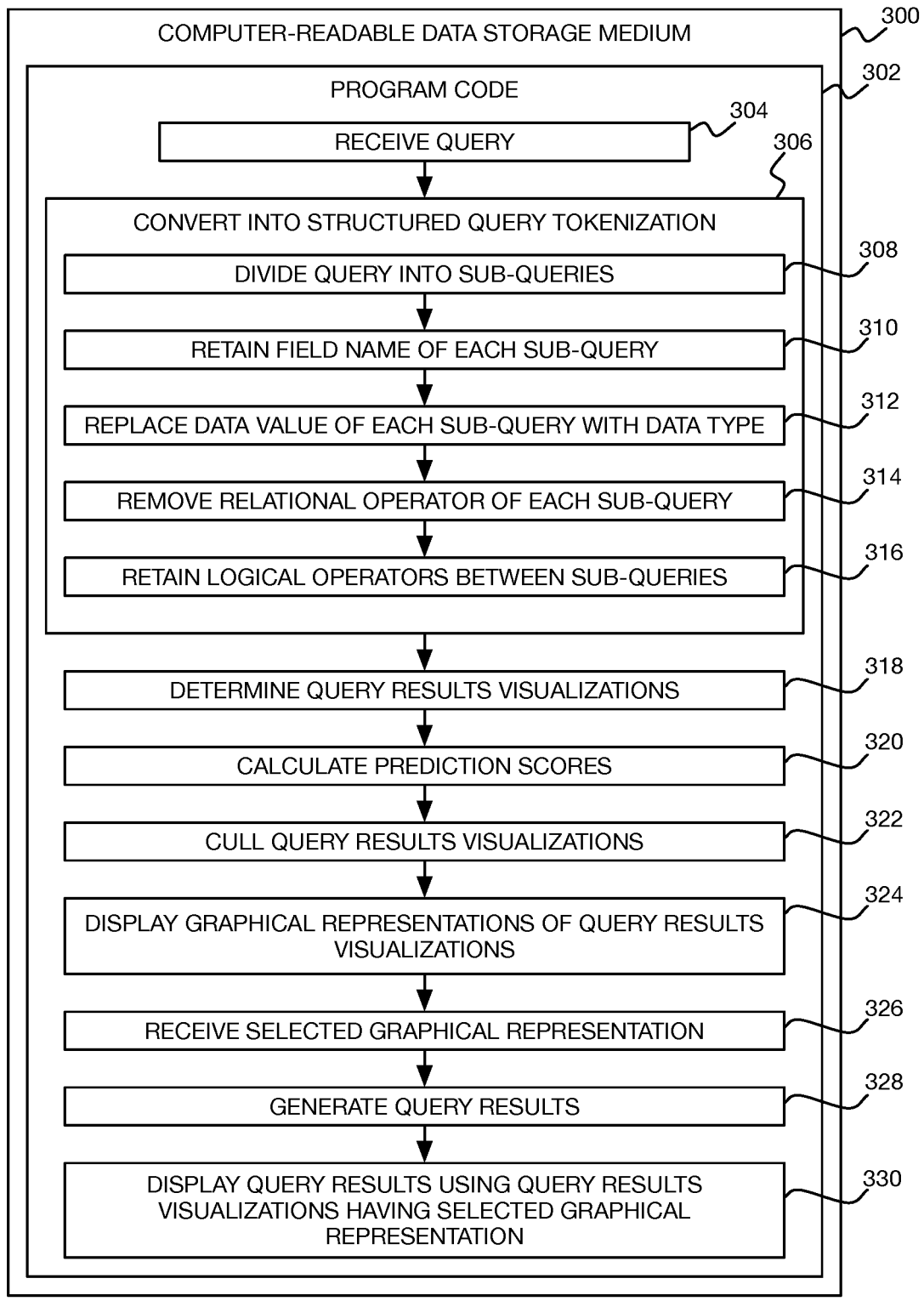
FIG. 3 is a diagram of an example non-transitory computer-readable data storage medium storing program code executable to display query results of a query using a supervised machine learning model-determined query results visualization.

FIG. 3 shows an example non-transitory computer-readable data storage medium 300 storing program code 302 that is executable to display query results of a query using a supervised machine learning model-determined query results visualization. A processor of a computing system that is or includes a server or other type of computing device may execute the program code 302, for instance. Execution of the program code 302 results in the performance of processing that is consistent with the process 100 of FIG. 1 that has been described.

The processing includes receiving a query (304). For example, a user may enter the query. The processing includes converting the query into a structured query tokenization (306). Consistent with the example query 200 and the example structured query tokenization 250 of FIGS. 2A and 2B that have been described, conversion of the query into a particular structured query tokenization on which basis a supervised machine learning model can be trained and subsequently used to predict query results visualizations may include the following.

The query may be divided into its constituent sub-queries (308). The field name of each sub-query is retained within the structured query tokenization (310), whereas the data value of each sub-query is replaced with its data type within the structured query tokenization (312) and the relational operator of each sub-query is removed such that it is not part of the structured query tokenization (314). The logical operators between the sub-queries, by comparison, are retained within the structured query tokenization (316). As has been noted, the structured query tokenization into which the query is converted is not used and indeed cannot be used for query evaluation, but instead is particular to training and usage of a supervised machine learning model for query results visualization prediction.

Other processing can also be performed in converting the query into a structured query tokenization. For instance, calculated expressions and functions may be included in the structured query tokenization, where such calculated expressions and functions are not suitable for retrieval of records and thus are not ordinarily included in tokenization that may occur during query optimization on which basis the query is then executed. Examples of such calculated expressions include bytes in/bytes out; failed login/successful login; length (destination hostname), and so on. Examples of such functions include sum, average (avg), count, maximum (max), and so on.

The processing includes determining query results visualizations for the query by applying a supervised machine learning model to the structured query tokenization to which the query has been converted (318). The processing can include calculating prediction scores for the query and the determined query results visualizations (320). The processing can include culling the query results visualizations based on the calculated prediction scores (322). For example, only the query results visualizations that have prediction scores greater than a threshold may be retained. As another example, only a threshold number of the query results visualizations having the highest prediction scores 116 may be retained.

The processing can include displaying graphical representations of the resultantly culled query results visualizations (324). The display of a graphical representation of a query results visualization is not the display of the query results of the query using the query results visualization, and the query results may not yet have been generated (i.e., the query may not yet have been executed). Rather, the graphical representation is a thumbnail, icon, or other type of representation of the query results visualization, such as a thumbnail or icon of a generic line graph in the case of a line graph visualization, a thumbnail or icon of a generic bar chart in the case of a bar chart visualization, and so on.

The processing can include then receiving a selected graphical representation (326). For example, a user may select the graphical representation of the query results visualization in accordance with which the user wants to have the query results displayed. The processing includes generating the query results (328), such as by executing the query that has been received; the query results may be generated in the processing of FIG. 3 at any point after the query has been received. The processing includes then displaying the query results of the query using the query results visualization having the selected graphical representation (330).

Figure 4:
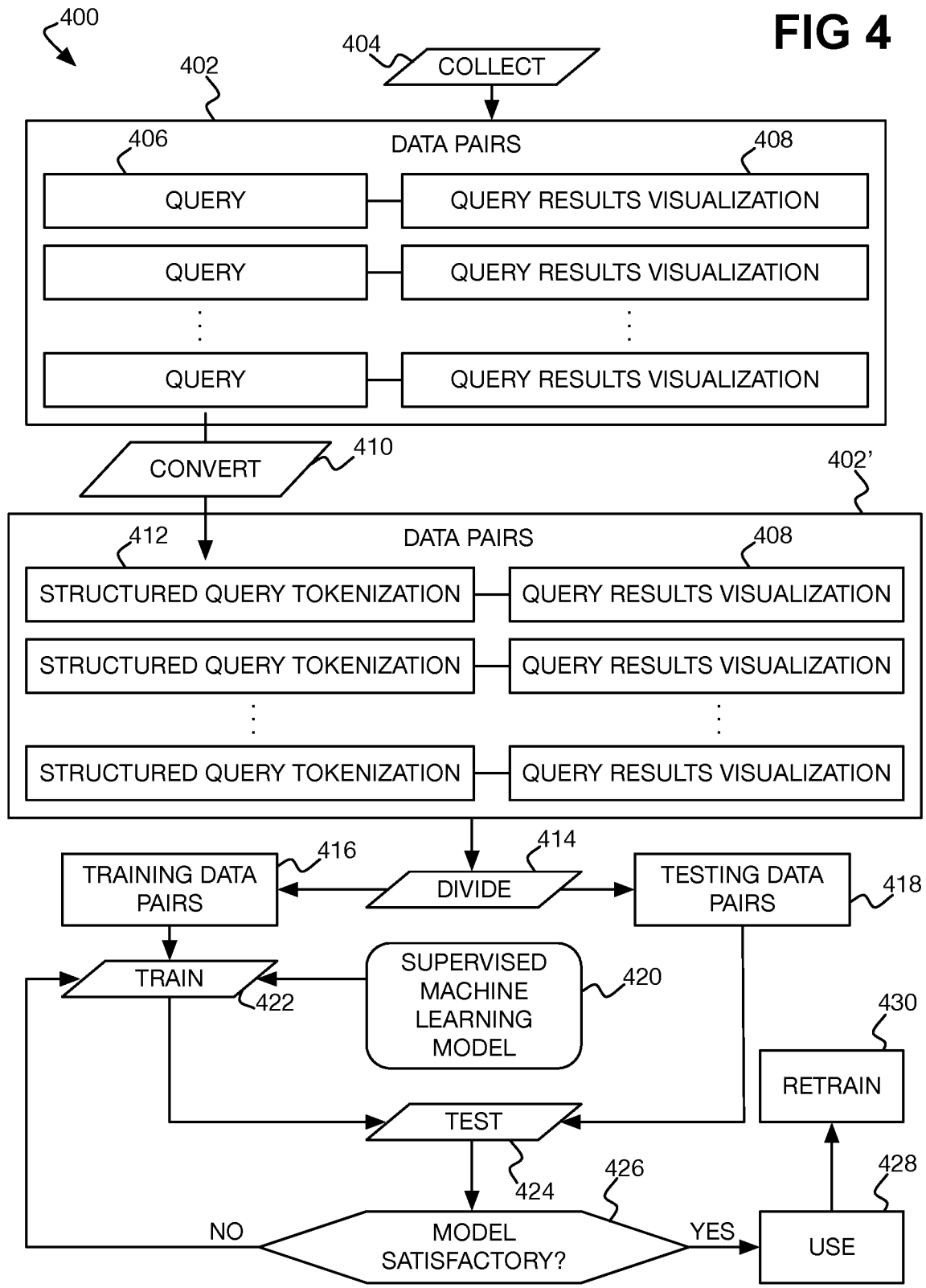
FIG. 4 is a diagram of an example process for training and using a supervised machine learning model to determine a query results visualization for displaying query results of a query.

FIG. 4 shows an example process 400 for training and using a supervised machine learning model to determine a query results visualization for displaying the query results of a query. The process 400 can encompass the process 100 of FIG. 1, and additionally includes training of the supervised machine learning model that is used to determine the query results visualization for a query. In general, the process 400 involves an initial collection of training data on which basis a supervised machine learning model 420 is trained, and then using the model 420 as has been described in the process 100, as well as retraining the model 420 for improved accuracy as it is used.

Data pairs 402 are thus first collected (404) as users execute queries 406 and create query results visualizations 408 for displaying the query results of the queries 406. Each data pair 402 is thus made up of a query 406 and a corresponding query results visualization 408. If the query results of a query 406 are displayed using more than one query results visualization 408, there are multiple data pairs 402 that each include the query 406 and one of these query results visualizations 408. In the initial iteration of the process 400, the users may manually create the query results visualizations 408, or the query results visualizations 408 may be determined in a manner other than by using the machine learning model 420. That is, before the supervised machine learning model 420 can be trained and used, training data for training (and testing) the model is initially collected as the users create the query results visualizations 408 for the queries 406. The training data is thus made up of the data pairs 402.

The data pairs 402 are therefore collected as the queries 406 are run and as query results visualizations 408 for displaying the query results of the queries 406 are created. The queries 406 of the data pairs 402 are converted into corresponding structured query tokenizations 412, resulting in data pairs 402' that each include a structured query tokenization 412 and an associated query results visualization 408. The queries 406 are converted (410) into structured query tokenizations 412 as has been described in relation to the computer-readable data storage medium 300 of FIG. 3.

The data pairs 402' are divided (414) into training data pairs 416 and testing data pairs 418. For instance, 70% of the data pairs 402' may be assigned as the training data pairs 416, and the other 30% may be assigned as the testing data pairs 418. A data pair 402' may not be assigned as both a training data pair 416 and a testing data pair 418. Each training data pair 416 is said to include a training structured query tokenization and a training query results visualization, which are the structured query tokenization 412 and the query results visualization 408 of one of the data pairs 402'. Similarly, each testing data pair 418 is said to include a testing structured query tokenization and a testing query results visualization, which are likewise the structured query tokenization 412 and the query results visualization 408 of one of the data pairs 402'. It is noted in this respect that to increase accuracy of the supervised machine learning model 420 and simulate real-world usage, the testing data pairs 418 should include queries that do not exist in the training data pairs 416, to assess accuracy of the model 420 and determine if improvement in the model 420 is needed.

The supervised machine learning model 420 is trained (422) using the training data pairs 416. The trained supervised machine learning model 420 can then be tested (424) using the testing data pairs 418. That is, the trained supervised machine learning model 420 can be applied to the query of the testing data pair 418 and the resulting query results visualization compared to the query results visualization of the testing data pair 418. Testing is performed to determine the accuracy of the model 420 in accurately predicting the query results visualizations of the respective queries of the testing data pairs 420. Another approach by which the model 420 may be tested is by manually accepting and rejecting the predicted query results visualizations for the queries, and determining the percentage of accepted visualizations out of all predicted visualizations.

If testing results in an unsatisfactorily trained model 420 (426)— that is, if the trained supervised machine learning model 420 does not accurately predict the query results visualizations for the structured query tokenizations of the testing data pairs 418 by more than a threshold— then further training may (422) be performed. Once testing results in a satisfactorily trained model 420 (426), the trained (and tested) supervised machine learning model 420 can then be used (428) to determine query visualization results for newly entered queries. These queries and query visualization results can, per arrow 430, in turn be collected (404) in further iterations of the process 400 to continuously (re)train the supervised machine learning model 420. For example, users may create different query visualization results for queries than those specified by the supervised machine learning model 420, or users may affirm or edit the query results visualizations that the machine learning model 420 outputs. As such additional information is collected, the supervised machine learning model 420 can be immediately (i.e., continuously) retrained (430) to improve the accuracy of the machine learning model 420.

Figure 5:
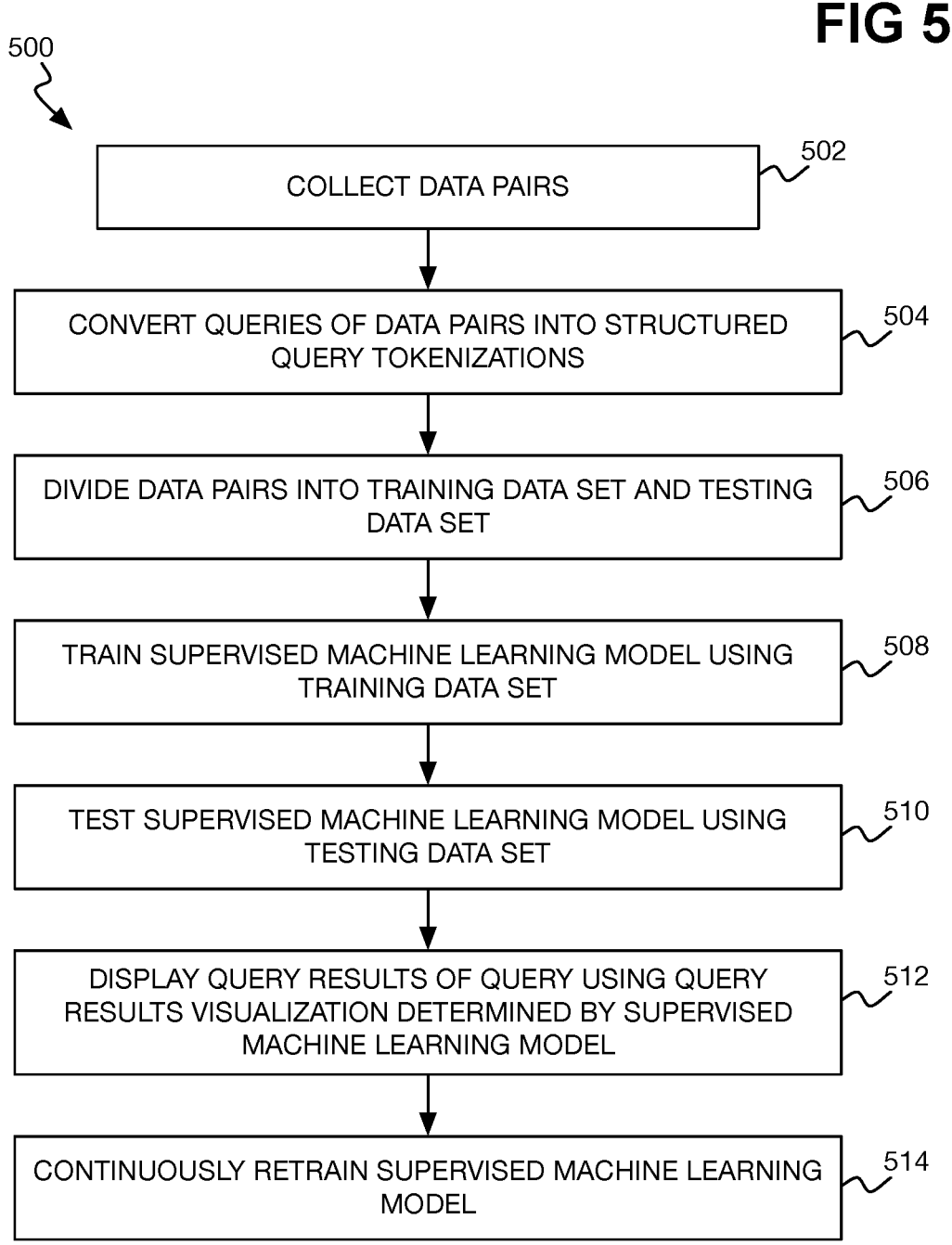
FIG. 5 is a flowchart of an example method for training and using a supervised machine learning model to determine a query results visualization for displaying query results of a query.

FIG. 5 shows an example method 500 for training and using a supervised machine learning model to determine a query results visualization for displaying query results of a query. The method 500 may be implemented as program code stored on a non-transitory computer-readable data storage medium and executed by a processor of a computing system. The method 500 can encompasses the processing of FIG. 3 that has been described, and is consistent with the process 400 of FIG. 4 that has been described.

The method 500 includes collecting data pairs (502), which each include a query and a query results visualization. The method 500 includes converting the queries into structured query tokenizations (504), and dividing the resulting data pairs into a training data set and a testing data set (506). The training data set thus includes training data pairs that each include a training structured query tokenization and a training query results visualization, and the testing data set includes testing data pairs that each include a testing structured query tokenization and a testing query results visualization.

The method 500 includes training the supervised machine learning model using the training data set (508), and then testing the trained supervised machine learning model using the test data set (510). Once the supervised machine learning model is deemed satisfactory, the method 500 includes then displaying query results of a (new) query using a query results visualization determined by the (tested and trained) supervised machine learning model (512), as has been described. The method 500 can include continuously retraining the supervised machine learning model (514) as additional data pairs are collected (e.g., such as each additional data pair is collected).

Figure 6:
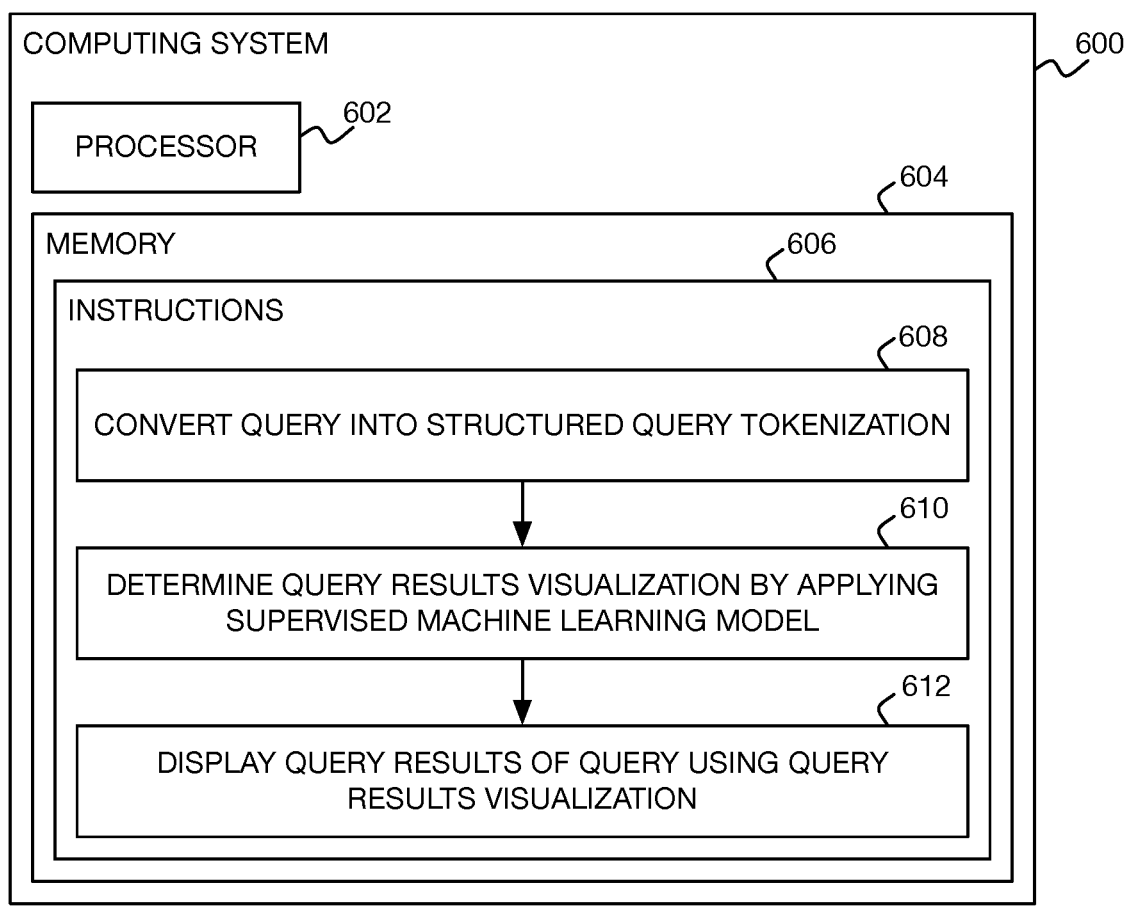
FIG. 6 is a diagram of an example computing system for displaying query results of a query using a supervised machine learning model-determined query results visualization.

FIG. 6 shows an example computing system 600. The computing system 600 may be or include a computing device, such as a server or another type of computer. The computing system 600 includes a processor 602 and a memory 604, which is a type of non-volatile computer-readable data storage medium. The memory 604 stores instructions 606 executable by the processor 602 to perform processing.

The processing includes converting a query into a structured query tokenization (608). The processing includes determining a query results visualization for the query by applying a supervised machine learning model to the structured query tokenization corresponding to the query (610), which is the structured query tokenization to which the query has been converted. The processing includes displaying query results of the query, as may be generated by executing the query, using the determined query results visualization (612).

Techniques have been described for determining a query results visualization for a query using a supervised machine learning model. Rather than using the query itself as input to the supervised machine learning model, the query is first converted to a structured query tokenization different than the type of tokenization that may be used to execute the query. Such a structured query tokenization enables the ability of the supervised machine learning model to predict a suitable query results visualization in accordance with which the query results of a query can be displayed.

We claim:

1. A non-transitory computer-readable data storage medium storing program code executable by a processor to perform processing comprising:
receiving a query comprising a plurality of sub-queries separated by logical operators, each sub-query comprising a field name and a data value interrelated to one another by a relational operator;
converting the query into a structured query tokenization such that that the data value of each sub-query is replaced by a data type of the data value and the relational operator of each sub-query is removed;

determining one or more query results visualizations for the query by applying a supervised machine learning model to the structured query tokenization to improve how query results of the query are visualized, each query results visualization comprising a graphical representation of which the query results of the query are displayed using graphical elements;

generating the query results of the query by executing the query without using the structured query tokenization into which the query has been converted such that the structured query tokenization is used just for determining the query results visualizations; and displaying query results of the query using the determined query results visualizations.

2. The non-transitory computer-readable data storage medium of claim 1, wherein the structured query tokenization cannot be used for executing the query.

3. The non-transitory computer-readable data storage medium of claim 1, wherein the field name of each sub-query within the query is retained within the structured query tokenization.

4. The non-transitory computer-readable data storage medium of claim 1, wherein the logical operators separating the sub-queries of the query are retained within the structured query tokenization, and wherein the structured query tokenization includes functions and/or calculated expressions not used for query evaluation.

5. The non-transitory computer-readable data storage medium of claim 1, wherein converting the query into the structured query tokenization comprises:

dividing the query into the sub-queries;
retaining the field name of each sub-query;
replacing the data value of each sub-query with the data type of the data value; and
removing the relational operator of each sub-query.

6. The non-transitory computer-readable data storage medium of claim 5, wherein converting the query into the structured query tokenization further comprises:

retaining the logical operators.

7. The non-transitory computer-readable data storage medium of claim 1, wherein the processing further comprises:

calculating a prediction score for the query as to each query results visualization with respect to the structured query tokenization; and culling the query results visualizations based on the calculated prediction scores of the query results visualizations.

8. The non-transitory computer-readable data storage medium of claim 7, wherein culling the query results visualizations based on the calculated prediction scores of the query results visualizations comprises one or more of:

retaining only the query results visualizations having the calculated prediction scores that are greater than a threshold;

retaining only a threshold number of the query results visualizations having the calculated prediction scores that are highest.

9. The non-transitory computer-readable data storage medium of claim 1, wherein the processing further comprises:

displaying the graphical representation of each query results visualization; and receiving a selected graphical representation, wherein displaying the query results of the query using the determined query results visualizations comprises displaying the query results of the query using the determined query results visualization having the selected graphical representation.

10. A method comprising:

training, by a processor, a supervised machine learning model using a training data set comprising a plurality of training data pairs that each comprise a training structured query tokenization for a corresponding training query and a training query results visualization for the corresponding training query; and displaying, by the processor, query results of a query using a query results visualization determined for the query by the trained supervised machine learning model, wherein the query results visualization improves how the query results of the query are visualized and comprises a graphical representation of which the query results of the query are displayed using graphical elements, wherein the training query of each training data pair comprises a plurality of sub-queries separated by logical operators, each sub-query comprising a field name and a data value interrelated to one another by a relational operator, and wherein in the training structured query tokenization of each training data pair, the data value of each sub-query of the corresponding training query is replaced by a data type of the data value and the relational operator of each sub-query of the corresponding training query is removed.

11. The method of claim 10, further comprising:

testing, by the processor, the trained supervised machine learning model using a testing data set comprising a plurality of testing data pairs that each comprise a testing structured query tokenization of a testing query and a testing query results visualization for the testing query.

12. The method of claim 11, further comprising:

collecting, by the processor, data pairs that each comprise a query and a query results visualization for the query;

converting, by the processor, the query of each data pair into a structured query tokenization; and dividing, by the processor, the data pairs into the training data set and the testing data set, wherein the data pairs of the testing data set are different than the data pairs of the training data set.

13. The method of claim 10, further comprising:

continuously retraining, by the processor, the supervised machine learning model.

14. The method of claim 10, wherein for each training data pair, the training structured query tokenization cannot be used for executing the corresponding training query.

15. The method of claim 10, wherein for each training data pair, the field name of each sub-query within the corresponding training query is retained within the training structured query tokenization.

16. The method of claim 10, further comprising:

receiving, by the processor, the query;

converting, by the processor, the query to a structured query tokenization; and applying, by the processor, the trained supervised machine learning model to the structured query tokenization to determine the query results visualization for the query.

17. The method of claim 10, further comprising:
converting, by the processor, the corresponding training query for each training data pair into the training structured query tokenization for the corresponding training query.

18. A computing system comprising:
a processor; and
a memory storing instructions executable by the processor to:
- receive a query comprising a plurality of sub-queries separated by logical operators, each sub-query comprising a field name and a data value interrelated to one another by a relational operator;
- convert the query into a structured query tokenization such that that the data value of each sub-query is replaced by a data type of the data value and the relational operator of each sub-query is removed;
- determine a query results visualization for the query by applying a supervised machine learning model to the structured query tokenization, the query results visualization improving how query results of the query are visualized and comprising a graphical representation of which the query results of the query are displayed using graphical elements; and
- display query results of the query using the determined query results visualization.

19. The computing system of claim 18, wherein the instructions are executable by the processor to convert the query into the structured query tokenization by:
- dividing the query into the sub-queries;
- retaining the field name of each sub-query;
- replacing the data value of each sub-query with the data type of the data value; and
- removing the relational operator of each sub-query.

20. The computing system of claim 18, wherein the instructions are executable by the processor to convert the query into the structured query tokenization by further:
retaining the logical operators.

* * * * *